(12) United States Patent
Zheng et al.

(10) Patent No.: US 10,617,501 B2
(45) Date of Patent: Apr. 14, 2020

(54) ELECTRIC TOOTHBRUSH

(71) Applicant: Ningbo Aolbea Oral Care Products Co., Ltd., Yuyao, Ningbo, Zhejiang (CN)

(72) Inventors: Jianli Zheng, Zhejiang (CN); Sijun Xiong, Zhejiang (CN)

(73) Assignee: Ningbo Aolbea Oral Care Products Co., Ltd., Ningbo, Zhejiang (CN)

( * ) Notice: Subject to any disclaimer, the term of this patent is extended or adjusted under 35 U.S.C. 154(b) by 212 days.

(21) Appl. No.: 15/690,825

(22) Filed: Aug. 30, 2017

(65) Prior Publication Data

US 2018/0055616 A1 Mar. 1, 2018

(30) Foreign Application Priority Data

Aug. 31, 2016 (CN) .......................... 2016 1 0795726
Mar. 16, 2017 (CN) ..................... 2017 2 0257562 U

(51) Int. Cl.
*A61C 17/22* (2006.01)
*A46B 9/04* (2006.01)

(52) U.S. Cl.
CPC .............. *A61C 17/225* (2013.01); *A46B 9/04* (2013.01)

(58) Field of Classification Search
CPC ................................ A46B 9/04; A61C 17/225
See application file for complete search history.

(56) References Cited

U.S. PATENT DOCUMENTS

2012/0198635 A1* 8/2012 Hilscher ................ A61B 18/00
15/22.1
2017/0007384 A1* 1/2017 Wagner .............. A61C 17/3409

FOREIGN PATENT DOCUMENTS

| CN | 105411714 A | * | 3/2016 |
| CN | 105943178 A | | 9/2016 |
| CN | 206342557 U | | 7/2017 |

OTHER PUBLICATIONS

CN-105411714-A—English Machine Translation (Year: 2016).*

* cited by examiner

*Primary Examiner* — Marc Carlson
(74) *Attorney, Agent, or Firm* — Novick, Kim & Lee, PLLC; Allen Xue

(57) ABSTRACT

A electric toothbrush comprises a handle and a brush head. A motor is arranged in the handle and a transmission rod is arranged in the brush head. The motor has a rotating shaft, which extends from a casing of the motor. A transmission connection member is arranged between the transmission rod and the rotating shaft of the motor, one end of the transmission connection member is connected with the rotating shaft, the other end is connected with the transmission rod. A sealing member surrounding the rotating shaft is arranged at the rotating shaft extending position of the outer surface of the casing. The sealing member extends from the outer surface of the casing of the motor to the transmission connection member, and a gap between the inside of the sealing member and the rotating shaft constitutes a first cavity. A second cavity is formed between the sealing member and a sleeving cavity of the transmission connection member.

12 Claims, 5 Drawing Sheets

ELECTRIC TOOTHBRUSH

CROSS-REFERENCE TO RELATED APPLICATIONS

The present application claims the priorities of Chinese Patent Application CN201610795726.8 filed on Aug. 31, 2016 and Chinese Patent Application CN201720257562.3 filed on Mar. 16, 2017.

TECHNICAL FIELD

The present invention relates to a toothbrush, particularly to an electric toothbrush.

BACKGROUND

An electric toothbrush is ordinarily shown in FIG. 1, including a handle 1 and a brush head, wherein a motor 3 is arranged in the handle 1, a transmission rod is arranged in the brush head, a motor is provided with a rotating shaft 32, the rotating shaft extends from the casing 31 of the motor, a transmission connection member 4 is arranged between the transmission rod and the rotating shaft 32 of the motor, the transmission connection member 4 is used for connecting the rotating shaft 32 extending from the casing of the motor with the transmission rod, and the rotating shaft 32 transmits power to the transmission rod through the transmission connection member 4 to drive the transmission rod to move and further drive the brush head to do a movement of cleaning teeth; a conventional sealing member 5' is arranged at a rotating shaft extending position of the outer surface of the casing 31, and the conventional sealing member 5' is arranged around the rotating shaft 32 of the motor to seal the casing 31 of the motor and prevent damage of the motor 3 caused by water and other pollutants which are generated when teeth are brushed and enter the inside of the casing of the motor; in order to improve the effect of sealing, the sealing member remains a cavity 51' between the rotating shaft and the casing, and the cavity 51' is filled with sealing oil, so that the sealing effect of the sealing member is better.

The prior art has the disadvantages that the sealing member is fixed by the handle and keeps static sealing connection with the casing of the motor, the sealing member and the rotating shaft are in rotary sealing connection, when the teeth are brushed, a powdered material of toothpaste generates an abrasion effect on a seal fitting position of the sealing member and the rotating shaft, and accordingly, leakage is easily caused after the toothbrush is used for a long time, water and other corrosive materials enter the motor from the seal fitting position to damage the motor.

Information disclosed under the background section is only for enhancement of understanding of the general background of the present invention and should not be taken as an acknowledgement or any form of suggestion that this information forms the prior art already known to a person skilled in the art.

SUMMARY

In view of the deficiency of the prior art, it is an object of the present invention to provide an electric toothbrush, so as to better protect a motor of the toothbrush and ensure the working safety and the working service life of the electric toothbrush.

The present invention discloses an electric toothbrush, including a handle and a brush head, wherein a motor is arranged in the handle, a transmission rod is arranged in the brush head, the motor is provided with a rotating shaft, the rotating shaft extends from a casing of the motor, a transmission connection member is arranged between the transmission rod and the rotating shaft of the motor, one end of the transmission connection member is connected with the rotating shaft, the other end is connected with the transmission rod, and a sealing member surrounding the rotating shaft is arranged at the rotating shaft extending position of the outer surface of the casing; the sealing member extends from the outer surface of the casing of the motor to the transmission connection member, and a gap between the inside of the sealing member and the rotating shaft constitutes a first cavity; an end face, facing the rotating shaft, of the transmission connection member and the outer surface of the sealing member form rotatory sealing connection; a second cavity is formed between the sealing member and a sleeving cavity of the transmission connection member.

In the above technical scheme, further preferably, the sealing member is a cylindrical thin casing of which one end is opening, the opening end of the thin casing faces the motor, the inner diameter of the sealing member is larger than the diameter of the rotating shaft, the rotating shaft penetrates through an axle hole of the bottom of the thin casing, and the opening end of the sealing member extends outwardly to from a sealing flange.

In the above technical scheme, further preferably, the inside of the handle is provided with a fixation wall facing the motor, the fixation wall is abutted against the sealing flange to compress the sealing member to be hermetically abutted against the casing of the motor, that is, the inside of the handle is provided with ribs facing the motor, the ribs are abutted against the sealing flange to compress the sealing member to be hermetically abutted against the casing of the motor.

In the above technical scheme, further preferably, the end face, facing the rotating shaft, of the transmission connection member is also provided with a sleeving cavity sleeving the sealing member, the sleeving cavity sleeves the cylindrical surface of the sealing member from the outside, and the outer surface of the sealing member and the sleeving cavity form rotatory sealing connection. When teeth are brushed, tooth power generates abrasion influence on the sealing member and the rotating shaft only after abrading the sealing member and the sleeving cavity firstly, which greatly increases the reliability of sealing and prolongs the working service life of the toothbrush.

In the above technical scheme, further preferably, the cylindrical outer surface of the sealing member is circumferentially provided with seal ribs which increase the sealing effect between the sealing member and the sleeving cavity.

In the above technical scheme, further preferably, three seal ribs are arranged, which may ensure the sealing effect between the sealing member and the sleeving cavity.

In the above technical scheme, further preferably, the first cavity is filled with sealing oil, so that the sealing effect of the sealing member is better, and meanwhile, the sealing oil may also reduce rotary friction between the rotating shaft and the sealing member.

In the above technical scheme, further preferably, a spacing is kept between the end face of the sealing member and the bottom surface of the sleeving cavity, and the outside of the end face of the sealing member and the sleeving cavity enclose a second cavity, so that tooth powder penetrating through the sealing member to enter the second cavity is not capable of causing abrasion between the sealing member and the rotating shaft in a short time.

In the above technical scheme, further preferably, the second cavity is filled with the sealing oil, thus further improving sealing and anti-abrasion effects, and also reducing rotary friction between the transmission connection member and the sealing member.

In the above technical scheme, further preferably, the bottom surface of the sealing member is of a conical structure protruding towards the transmission connection member, so that the sealing member is difficult to retract when being sleeved into the rotating shaft, and aggregation of tooth powder entering the second cavity nearby the rotating shaft is avoided.

In the above technical scheme, further preferably, the inside of the second cavity is also provided with an obstruction rib which is arranged in a manner that the outer surface of the sealing member is protruded and surrounds the rotating shaft, and a gap is kept between the top surface of the obstruction rib and the inner surface of the sleeving cavity, so that the sealing member does not further interfere with rotation of the transmission connection member, and meanwhile, water and pollutants permeating into the second cavity are obstructed from approaching a seal gap between the rotating shaft and the sealing member so as to ensure that powdered pollutants cannot enter the first cavity and also reduce a possibility that water enters the first cavity.

In the above technical scheme, further preferably, the inner surface of the sleeving cavity of the transmission connection member and the seal ribs are abutted and simultaneously keep mutual rotation.

In the above technical scheme, further preferably, the end part of the fixation wall is abutted against the sealing flange of the sealing member, and compresses the sealing flange of the sealing member to be abutted against the casing of the motor.

In the above technical scheme, further preferably, the fixation wall extends towards an inner lower direction from a port of the handle, and the sealing flange extends from the lower port of the sealing member to the outside of the fixation wall along an outer radial direction.

In the above technical scheme, further preferably, the lower end of the sleeving cavity is opening, the lower end of the sleeving cavity is of a stepped shape having a large-diameter upper end and a small-diameter lower end, the opening end sleeves the rotating shaft, the upper end of the rotating shaft is inserted into the upper-end cavity of the sleeving cavity, and the sealing members are arranged between the lower-end cavity and the outer surface of the casing of the motor between the lower-end cavity and the rotating shaft.

Compared with the prior art, the electric toothbrush disclosed by the present invention has the following advantages:

(1) compared with the prior art, in the present invention, through extending the sealing member from the casing of the motor to the transmission connection member and arranging the sleeving cavity on the end face of the transmission connection member, the sealing length and the sealing area of the sealing member are increased, the motor is protected better, and the working safety and the working service life of the electric toothbrush are improved; through arranging the first cavity and the second cavity in the sealing member and filling the cavities with the sealing oil, the sealing effect of the sealing member is ensured, and meanwhile, friction between the sealing member and the rotating shaft and friction between the sealing member and the transmission connection member are reduced.

(2) compared with the prior art, in the present invention, through arranging the obstruction rib on the outer surface of the sealing member in the second cavity, solid particulates are separated from the seal gap between the rotating shaft and the sealing member so as to ensure that the powdered pollutants cannot enter the first cavity and also reduce a possibility that water enters the first cavity; and the electric toothbrush maintains a good sealing effect during the whole working service life period to ensure the working safety of the electric toothbrush. Moreover, when a region between the obstruction rib and the rotating shaft of the motor is filled with the sealing oil, the obstruction rib may also obstruct the sealing oil in this region from being leaked, thereby further prolonging the service life of the electric toothbrush.

Figure 1:
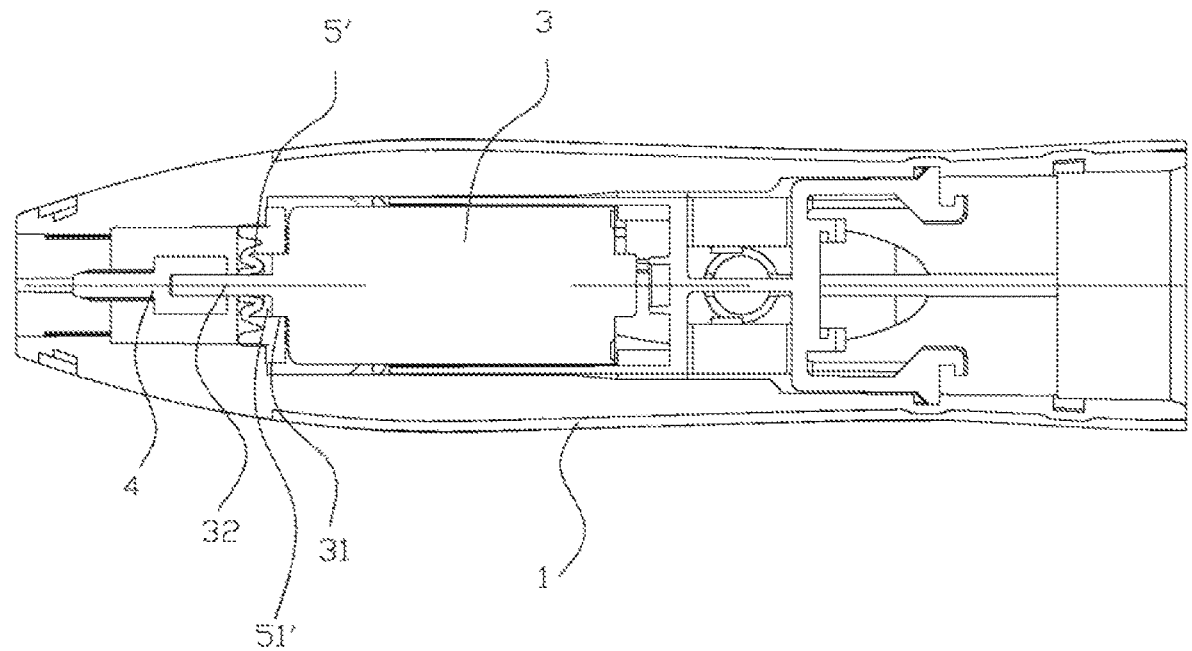
FIG. 1 is a schematic diagram of an electric toothbrush in the prior art.
Figure 2:
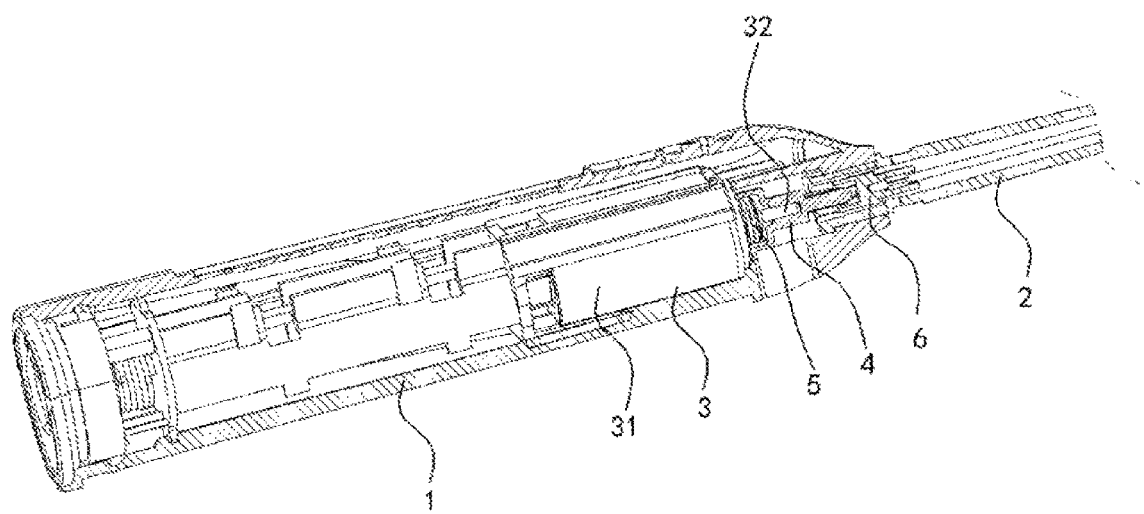
FIG. 2 is a schematic diagram (partial sectioning) of an electric toothbrush according to the present invention.
Figure 3:
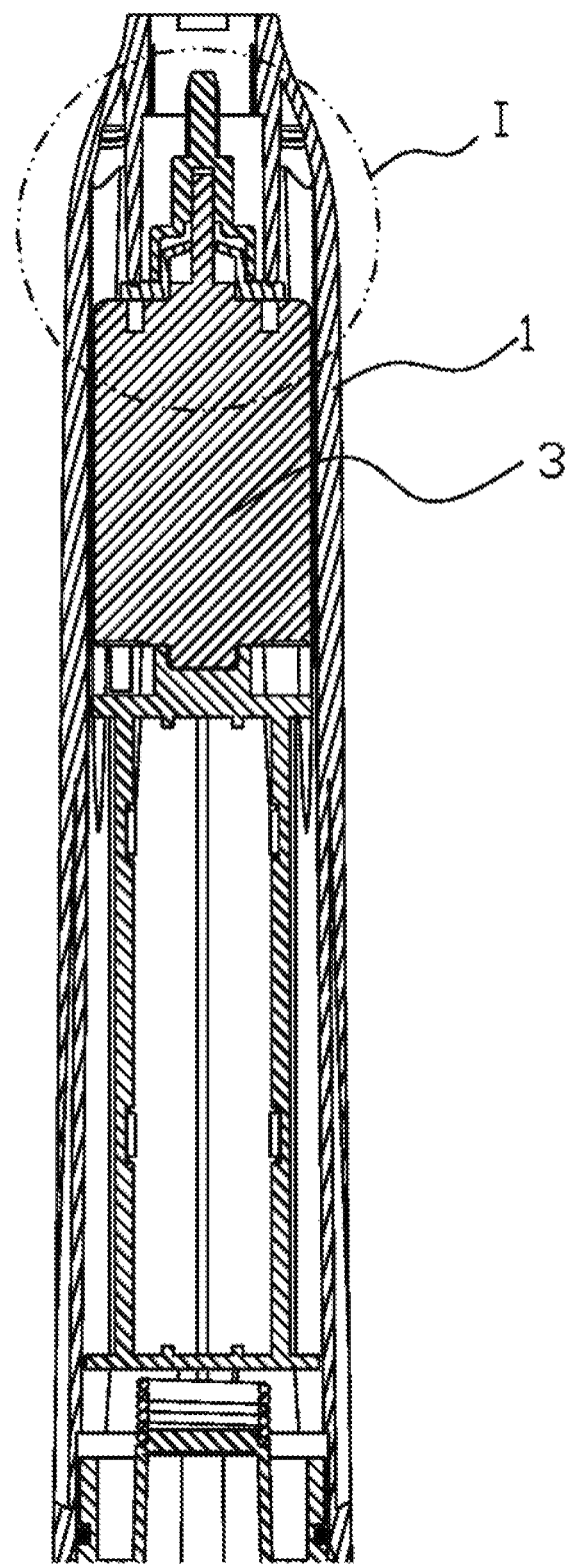
FIG. 3 is a sectional schematic diagram of an electric toothbrush according to the present invention.

Reference numbers: 1—handle; 11—fixation wall; 2—brush head; 3—motor; 31—casing; 32—rotating shaft; 4—transmission connection member; 41—lower-end cavity; 42—upper-end cavity; 5—sealing member; 5'—conventional sealing member; 51—first cavity; 51'—cavity; 52—second cavity; 53—sealing flange; 54—seal rib; 6—transmission rod; 7—obstruction rib.

DETAILED DESCRIPTION

Embodiments of the present invention will be described in detail below in conjunction with accompanying drawings, but it should be understood that the protection scope of the present invention is not limited by the embodiments.

Unless other definite expressions are given, in the whole specification and claims, a term "comprise" or its variations such as "contain" or "include" shall be understood as comprising the mentioned elements or components but not excluding other elements or other components.

A "rib" abutted against a sealing flange of a sealing member in Chinese Patent Application CN201610795726.8 (first patent) and a "fixation wall" in Chinese Patent Application CN 201720257562.3 (second patent) are the same part of the electric toothbrush but have different names in the two patents, and are uniformly named "fixation wall" in the present invention in order to unify the name.

A "first cavity" in the first patent and a "second cavity" in the second patent are the same structure of the electric toothbrush but have different names in the two patents, and are uniformly named "first cavity" in the present invention in order to unify the name.

A "second cavity" in the first patent and a "first cavity" in the second patent are the same structure of the electric toothbrush but have different names in the two patents, and are uniformly named "second cavity" in the present invention in order to unify the name.

A "sleeving hole of a sealing member" of a transmission connection member in the first patent and a "sleeving cavity of a transmission connection member in the second patent are the same structure of the electric toothbrush but have different names, and are uniformly named "sleeving cavity in the present invention in order to unify the name.

A "sealing flange" of a sealing member in the first patent and an "edge" of a sealing member in the second patent are the same part of the electric toothbrush but have different names, and are uniformly named "sealing flange" in the present invention in order to unify the name.

As shown in FIGS. 2, 3, 4, 5, 6 and 7, an electric toothbrush disclosed by the present invention includes a handle 1 and a brush head 2, wherein a motor 3 is arranged in the handle, a transmission rod 6 is arranged in the brush head 2, the motor 3 is provided with a rotating shaft 32, the rotating shaft 32 extends from a casing 31 of the motor 3, a transmission connection member 4 is arranged between the transmission rod 6 and the rotating shaft 32 of the motor, one end of the transmission connection member 4 is connected with the rotating shaft 32, the other end is connected with the transmission rod 6, and a power is transmitted from the motor 3 to the transmission rod 6 to drive the transmission rod to move; a sealing member 5 surrounding the rotating shaft is arranged at the rotating shaft 32 extending position of the outer surface of the casing 31; the sealing member 5 extends from the outer surface of the casing 31 of the motor to the transmission connection member 4, and a gap between the inside of the sealing member 5 and the rotating shaft 32 constitutes a first cavity 51; an end face, facing the rotating shaft, of the transmission connection member 4 and the outer surface of the sealing member 5 form rotatory sealing connection; a second cavity is formed between the sealing member 5 and a sleeving cavity of the transmission connection member 4.

Figure 4:
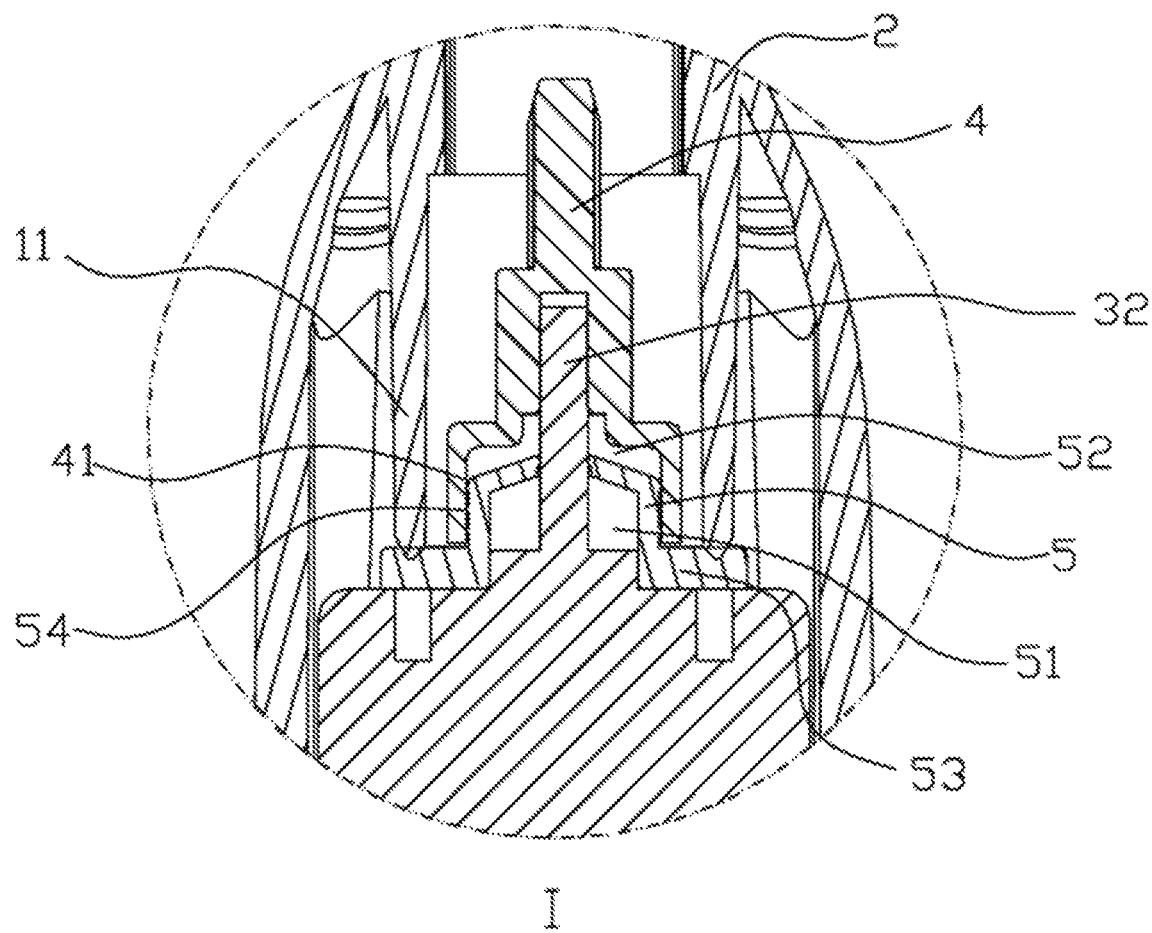
FIG. 4 is a partial enlarged view I of FIG. 3.
Figure 5:
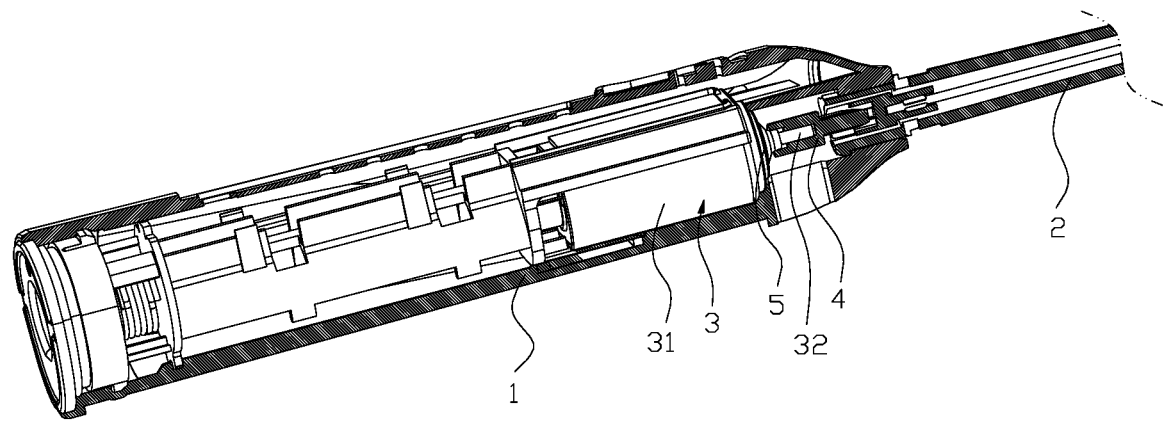
FIG. 5 is an integral schematic diagram of an electric toothbrush (a brush head is partially hidden)
Figure 7:
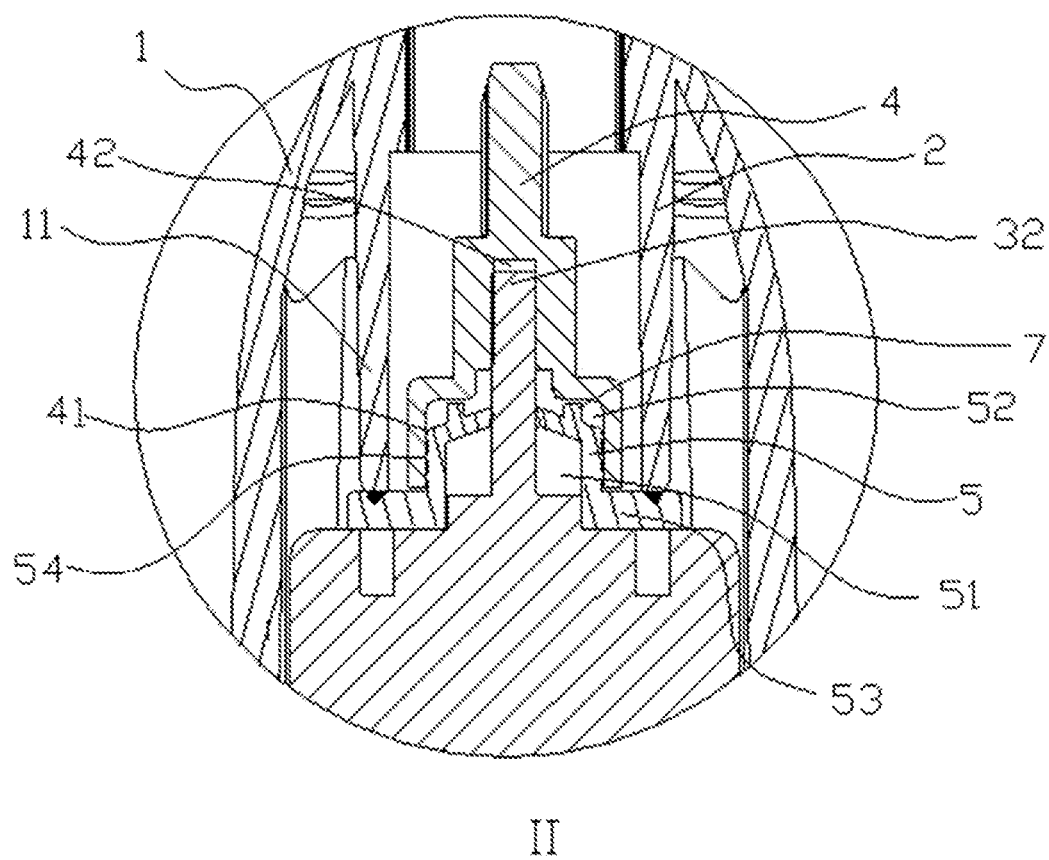
FIG. 7 is a partial enlarged view II of FIG. 2.

Further, as shown in FIGS. 4 and 7, the sealing member 5 is a cylindrical thin casing of which one end is opening, the opening end of the thin casing faces the motor 3, the inner diameter of the sealing member 5 is larger than the diameter of the rotating shaft 32, the rotating shaft 32 penetrates through the axle hole of the bottom of the thin casing, and the opening end of the sealing member 5 extends outwardly from a sealing flange 53.

Further, as shown in FIGS. 4 and 7, the inside of the handle is provided with a fixation wall 11 facing the motor, the fixation wall 11 is abutted against the sealing flange 53 to compress the sealing member 5 to be hermetically abutted against the casing 31 of the motor. Further, the fixation wall 11 extends towards an inner lower direction from a port of the handle, the sealing flange 53 extends from the lower port of the sealing member 5 to the outside of the fixation wall 11 along an outer radial direction, the end part of the fixation wall 11 is abutted against the sealing flange 53 of the sealing member 5 and compresses the sealing flange 53 of the sealing member to be abutted against the casing 31 of the motor so that the motor 3 is fastened in the handle 1, a sealing compression region is simultaneously formed on the surface of the sealing member 5, and a space between the casing 31 of the motor and the inside of the handle 1 is sealed by virtue of the sealing member 5.

Further, as shown in FIGS. 4 and 7, the end face, facing the rotating shaft, of the transmission connection member 4 is also provided with a sleeving cavity sleeving the sealing member, the sleeving cavity sleeves the cylindrical surface of the sealing member 5 from the outside, and the outer surface of the sealing member 5 and the sleeving cavity form rotatory sealing connection. Further, the lower end of the sleeving cavity is opening, the lower end of the sleeving cavity is of a stepped shape having a large-diameter upper end and a small-diameter lower end, the opening end sleeves the rotating shaft, the upper end of the rotating shaft is inserted into the upper-end cavity 42 of the sleeving cavity, and the sealing members 5 are arranged between the lower-end cavity 41 and the outer surface of the casing 31 of the motor between the lower-end cavity 41 and the rotating shaft 32.

Further, as shown in FIGS. 4 and 7, the cylindrical outer surface of the sealing member 5 is circumferentially provided with three seal ribs 54, which may ensure the sealing effect between the sealing member and the sleeving cavity. Further, the inner surface of the lower-end cavity 41 of the transmission connection member 4 is abutted against the seal ribs 54, which may ensure the sealing effect between the sealing member and the sleeving cavity and simultaneously keeps mutual rotation. The sealing oil may reduce a friction resistance generated by mutual rotation and reduce mutual abrasion.

Further, as shown in FIGS. 4 and 7, the first cavity 51 is filled with the sealing oil.

Further, as shown in FIGS. 4 and 7, a spacing is kept between the end face of the sealing member and the bottom surface of the sleeving cavity, and the outside of the end face of the sealing member and the sleeving cavity enclose a second cavity 52, and the second cavity 52 is filled with the sealing oil so that sealing and anti-abrasion effects are further improved, and meanwhile, rotatory friction between the transmission connection member and the sealing member is reduced.

Further, as shown in FIGS. 4 and 7, the bottom surface of the sealing member 5 is of a conical structure protruding towards the transmission connection member 4, so that the sealing member 5 is difficult to retract when being sleeved into the rotating shaft and aggregation of tooth powder entering the second cavity nearby the rotating shaft is avoided.

According to the present invention, through extending the sealing member from the casing of the motor to the transmission connection member and arranging the sleeving cavity on the transmission connection member, the sealing length and the sealing area of the sealing member are increased, the motor is protected better, and the working safety and the working service life of the electric toothbrush are improved; through arranging the first cavity and the second cavity in the sealing member and filling the cavities with the sealing oil, the sealing effect of the sealing member is ensured, and meanwhile, friction between the sealing member and the rotating shaft and friction between the sealing member and the transmission connection member are reduced.

Figure 6:
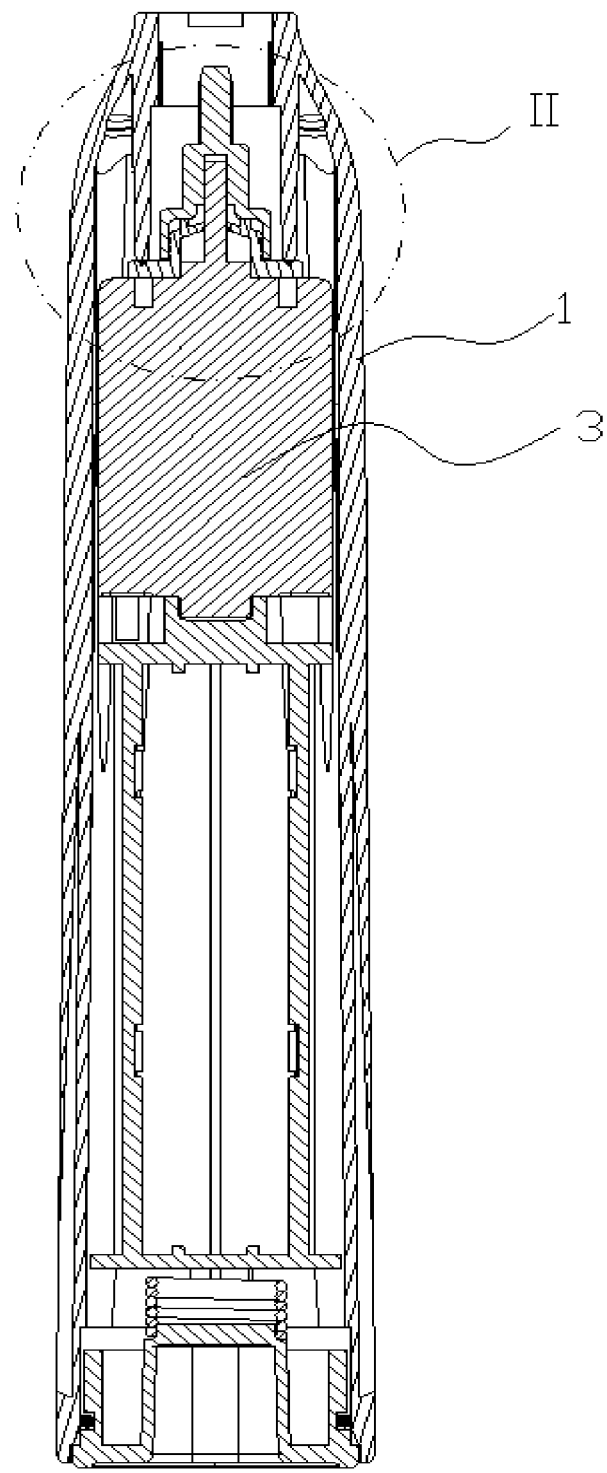
FIG. 6 is a sectional schematic diagram of an electric toothbrush according to the present invention.

Further, as shown in FIGS. 6 and 7, the inside of the second cavity 52 is also provided with an obstruction rib 7 which is arranged in a manner that the outer surface of the sealing member 5 is protruded and surrounds the rotating shaft 32, and a gap is kept between the top surface of the obstruction rib 7 and the inner surface of the sleeving cavity, so that the sealing member 5 does not further interfere with rotation of the transmission connection member 4, and meanwhile, water and pollutants permeating into the second cavity 52 are obstructed from approaching a seal gap between the rotating shaft and the sealing member to ensure that powdered pollutants cannot enter the first cavity 51 and also reduce a possibility that water enters the first cavity 51. Moreover, when a region between the obstruction rib 7 and the rotating shaft 32 of the motor is filled with the sealing oil, the obstruction rib 7 also can obstruct the sealing oil in this region from being leaked, thereby further prolonging the service life of the electric toothbrush.

According to the present invention, through arranging the obstruction rib on the outer surface of the sealing member in the second cavity, the solid particulates are separated from the seal gap between the rotating shaft and the sealing member so as to ensure that powered pollutants cannot enter the first cavity and also reduce a possibility that water enters the first cavity, the electric toothbrush maintains a good sealing effect during the whole working service life period, and the working safety of the electric toothbrush is also ensured.

The foregoing descriptions of exemplary embodiments of the present invention are presented for the purposes of illustration and exemplification. These descriptions are not intended to define the present invention as a disclosed precise form, and obviously, multiple modifications and variations are made according to the above teachings. The purpose of selecting and describing the exemplary embodiments is to explain the specific principle and practical applications of the present invention, so that those skilled in the art can implement and utilize various exemplary embodiments and various selections and variations of the present invention. The scope of the present invention is intended to be defined by claims and equivalents thereof.

The invention claimed is:

1. An electric toothbrush, comprising a handle and a brush head,
   wherein the brush head comprises a transmission rod,
   wherein the handle comprises a motor, a transmission connection member, a sealing member, and a rotating shaft extending from a casing of the motor through the sealing member and inserting into the transmission connection member,
   wherein the transmission connection member has a first end inserted into a cavity in the transmission rod in the brush head and a sleeving cavity that receives the rotating shaft,
   wherein the sealing member defines a first cavity enclosing a section of the rotating shaft and a portion of the motor casing where the rotating shaft extends from,
   wherein the transmission connection member sleeves over the sealing member so as to form a rotatory sealing connection between an inner surface of the transmission connection member and an outer surface of the sealing member, and
   wherein a second cavity is formed between the sealing member and the sleeving cavity of the transmission connection member,
   wherein the sealing member has a cover, a cylindrical wall connected to the cover, and a flanged opening opposite to the cover,
   wherein the flanged opening has a sealing flange abutting the outer surface of the motor casing, and
   wherein the rotating shaft extends through a hole in the cover.

2. The electric toothbrush according to claim 1, wherein the handle comprises a fixation wall arranged longitudinally along the handle, and the fixation wall presses against the sealing flange so as to form a hermetical seal with the outer surface of the motor casing.

3. The electric toothbrush according to claim 1, wherein the sleeving cavity of the transmission connection member sleeves over the cylindrical housing of the sealing member and forms a rotatory sealing connection between the outer surface of the cylindrical housing of the sealing member and an inner surface of the sleeving cavity in the transmission connection member.

4. The electric toothbrush according to claim 3, wherein a plurality of seal ribs are disposed between the outer surface of the cylindrical wall of the sealing member and the inner surface of the sleeving cavity in the transmission connection member.

5. The electric toothbrush according to claim 4, wherein three seal ribs are disposed circumferentially about the outer surface of the cylindrical wall of the sealing member.

6. The electric toothbrush according to claim 4, wherein the inner surface of the sleeving cavity of the transmission connection member and the seal ribs are in contact with each other and rotate together during operation.

7. The electric toothbrush according to claim 3, wherein the sleeving is of a stepped shape and comprises a first section having a first diameter, and a second section having a second diameter, wherein the second diameter is larger than the first diameter, wherein the first section sleeves over the first end of the rotating shaft and the second section sleeves over the cylindrical wall of the sealing member.

8. The electric toothbrush according to claim 1, wherein the first cavity is filled with a sealing oil.

9. The electric toothbrush according to claim 1, wherein the second cavity is defined between the cover of the sealing member and the inner surface of the sleeving cavity.

10. The electric toothbrush according to claim 1, wherein the second cavity is filled with a sealing oil.

11. The electric toothbrush according to claim 1, wherein the cover of the sealing member is of a conical structure protruding into the sleeving cavity in the transmission connection member.

12. The electric toothbrush according to claim 1, wherein the outer surface of the sealing member cover comprises an obstruction rib protruding into the second cavity.

* * * * *